United States Patent Office 3,414,399
Patented Dec. 3, 1968

3,414,399
METHOD FOR CONTROL OF PLANT GROWTH
Edward D. Weil, Lewiston, and Edwin Dorfman, Grand Island, N.Y., assignors to Hooker Chemical Corporation, Niagara Falls, N.Y., a corporation of New York
No Drawing. Filed Sept. 11, 1959, Ser. No. 839,309
2 Claims. (Cl. 71—115)

This invention is of a method of controlling plant growth, preferably a herbicidal method, in which the chemical 5-amino-2,3,6-trichlorobenzoic acid or various suitable derivatives thereof are employed. 5-amino-2,3,6-trichlorobenzoic acid has unique properties as a selective herbicide not logically predictable from the established heribicidal properties of the known compounds in its series.

The substance can be prepared in the following manner:

The nitro group of 5-nitro-2,3,6-trichlorobenzoic acid (the preparation of 5-nitro-2,3,6-trichlorobenzoic acid is given in copending application S.N. 740,992, now U.S. Patent 3,109,023) is reduced. A preferred method is hydrogenation in the presence of a nickel catalyst or a noble metal catalyst, although other reductants such as zinc, iron, tin, ferrous hydroxide, or the like, may also be used. The free acid may be converted to a salt by reaction with either a base such as sodium hydroxide, potassium hydroxide, ammonia, an amine, or with an acid such as hydrochloric or sulfuric acid. The utility of the compounds as heribicides does not appear to be appreciably influenced by the particular base or acid used to prepare the salts, and it is believed that these salts may all become converted to the free 5-amino-2,3,6-trichlorobenzoic acid in the soil. In a similar way, those derivatives of 5-amino-2,3,6-trichlorobenzoic acid, such as the esters and amides thereof, which readily hydrolyze to 5-amino-2,3,6-trichlorobenzoic acid under the mild conditions encountered in moist soil at ambient temperatures, may be employed in place of the free acid to obtain similar results. For economic reasons, we prefer to employ the sodium salt of 5-amino-2,3,6-trichlorobenzoic acid, or a salt with a simple organic amine such as dimethylamine, such salts being water soluble.

It is important in agricultural practice to use a plant growth regulator which will control weeds but which will have little or no adverse effect on the crops in the treated area. One of the most difficult problems in the herbicidal art has been the control of both broadleaf weeds and grasses in those crops which are sensitive to chemical heribicides. Such crops include many legumes and vegetables such as soybeans, cotton, lettuce, sweet potatoes, melons, carrots and others. Many prior art herbicides, including 2,4-dichlorophenoxyacetic acid and its salts, cannot be employed in the above mentioned crops, since the crops are readily damaged thereby. Certain chloroacetamides have been utilized to control grassy weeds in such crops, but are lacking in effectiveness on broadleaf weeds. Petroleum oils have had some utility in weeding carrots, but unfortunately, these oils apparently lack persistence in the soil and are expensive to use. This technique of using oils also appears limited to weeding of carrot and cotton crops. There is, therefore, a great need in the art for an inexpenesive selective compound capable of controlling both broadleaf and grassy weeds without damage to sensitive crops, and having the ability of controlling weeds over a period of many weeks following a single application. Applicants' invention utilizes such compositions, which are inexpensive to use and fill this long felt need. Such compositions of matter are also useful as intermediates and biological toxicants.

We have found that 5-amino-2,3,6-trichlorobenzoic acid and the salts thereof are selective herbicides having the desirable combination of properties outlined above. These compounds exhibit properties which could not have logically been predicted from the known properties of related compounds. It is, in fact, entirely unexpected that an aminobenzoic acid should have any usefulness as a herbicide, since the corresponding unchlorinated aminobenzoic acid is known to be inert as a plant growth regulator. It is furthermore surprising that 5-amino-2,3,6-trichlorobenzoic acid should have utility for weed control in herbicide-sensitive crops since the ordinary herbicidal chlorinated benzoic acids are extremely damaging to all of these crops and could not by any means be used for weed control in these crops.

The compounds of the invention may be employed in aqueous solutions or in organic solvents, such as hydrocarbons or alcohols. Solid carriers such as clay, talc, or vermiculite may also be employed. The various formulation adjuvants known to the herbicide art may be employed with these compounds. For example, wetting agents, dispersing agents, emulsifiers, sequentrants, and the like may be used. Also, combinations of these herbicides with other herbicides may be used, for example with N,N-diallyl-α-chloroacetamide, ethyl N,N-dipropyl thiolcarbamate, and similar compounds which do not destroy the crop tolerance characteristic of the compounds of the invention, and which can reinforce the herbicidal action toward certain weed species.

The preferred method of application is to apply the chemical to the soil prior to the emergence of crops, however, post-emergence applications are also effective against certain weeds. Rates of 1–8 pounds per acre are preferred.

To further illustrate our invention, the following examples are given:

Example 1.—Preparation of 5-Amino-2,3,6-trichlorobenzoic acid

Fifty parts by weight of twenty percent solution of water in methanol is employed to dissolve ten parts of 5-nitro-2,3,6-trichlorobenzoic acid (the synthesis of which is described in U.S. Patent No. 3,109,023). Approximately three parts of commercial Raney nickel catalyst or a commercial noble metal catalyst are added and the suspension is then agitated for eight hours under hydrogen at forty p.s.i. at 20–30 degrees centigrade. The suspension is then filtered, evaporated to dryness, and the residue recrystallized from aqueous methanol to obtain the desired product as a colorless crystalline solid, M.P. 239.5–240 degrees centigrade.

Analysis.—Calcd. for $C_7H_4O_2Cl_3N$: Cl, 44.3. Found: Cl, 43.2.

The compound was poorly soluble in cold water but soluble in aqueous hydrochloric acid to form the hydrochloride and soluble in aqueous sodium hydroxide to form the sodium salt.

Example 2.—Utility as a selective herbicide

A test area seeded with soybeans and snapbeans as representative herbicide-sensitive crops, and with foxtail, crabgrass, Johnson grass, dock, and mustard, as representative weeds was sprayed at four pounds per acre with 5-amino-2,3,6-trichlorobenzoic acid. Subsequently, the soybeans and snapbeans emerged and grew without damage, while the above-named weeds were totally controlled. The same weeds grew vigorously in an unsprayed control area.

The compound used in this invention is also useful as an intermediate, and may, for example, be converted to N-alkyl and N-acyl derivatives useful as biological toxicants.

Although the above examples and description of this invention has been very specifically illustrated, many other modifications will naturally suggest themselves to those skilled in the art upon a reading of this disclosure. These are intended to be comprehended within the scope of this invention.

We claim:
1. A method for the control of plant growth which comprises applying to the locus to be treated a phytotoxic amount of a compound selected from the group consisting of 5-amino-2,3,6-trichlorobenzoic acid, its alkali metal salts, its ammonium salts, its lower alkyl amine salts, its sulfuric acid addition salt and its hydrochloric acid addition salt.
2. A method for the control of plant growth which comprises applying to the locus to be treated a phytotoxic amount of 5-amino-2,3,6-trichlorobenzoic acid.

References Cited

UNITED STATES PATENTS

| 2,501,825 | 3/1950 | Lincoln | 260—518 |
|---|---|---|---|
| 2,274,716 | 3/1942 | Lyford | 260—518 |
| 2,447,998 | 8/1948 | Clapp et al. | 260—518 |
| 2,784,072 | 3/1957 | Gaaman et al. | 71—2.6 |
| 2,829,038 | 4/1958 | Ochsner | 71—2.6 |
| 2,100,242 | 11/1937 | Deese | 260—518 |
| 2,393,673 | 1/1946 | Wyss et al. | 260—518 |
| 3,009,806 | 11/1961 | Weil et al. | 260—501 |
| 3,014,063 | 12/1961 | McLane et al. | 260—501 |

OTHER REFERENCES

Sadler et al. "Jour. Am. Soc.," vol. 78, pp. 251–5 (1956).

Hemphill et al., Chemical Abst., vol. 51, 1957. col. 15868.

Beilstein, vol. 14, p. 418 (1931).

LORRAINE A. WEINBERGER, *Primary Examiner.*

L. A. THAXTON, *Assistant Examiner.*